United States Patent
Omori et al.

(10) Patent No.: US 11,010,229 B2
(45) Date of Patent: May 18, 2021

(54) ABNORMALITY DETERMINATION APPARATUS, ABNORMALITY DETERMINATION METHOD, AND COMPUTER READABLE MEDIUM

(71) Applicant: MITSUBISHI ELECTRIC CORPORATION, Tokyo (JP)

(72) Inventors: Yasuhiro Omori, Tokyo (JP); Hiroaki Ishikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 25 days.

(21) Appl. No.: 16/605,694

(22) PCT Filed: May 9, 2018

(86) PCT No.: PCT/JP2018/017855
§ 371 (c)(1),
(2) Date: Oct. 16, 2019

(87) PCT Pub. No.: WO2018/221136
PCT Pub. Date: Dec. 6, 2018

(65) Prior Publication Data
US 2020/0125441 A1 Apr. 23, 2020

(30) Foreign Application Priority Data

May 29, 2017 (WO) .................. PCT/JP2017/019842

(51) Int. Cl.
*G06F 11/00* (2006.01)
*G06F 11/07* (2006.01)
(Continued)

(52) U.S. Cl.
CPC ...... *G06F 11/0772* (2013.01); *G06F 11/0724* (2013.01); *G06F 11/0739* (2013.01);
(Continued)

(58) Field of Classification Search
CPC ............. G06F 11/0739; G06F 11/0751; G06F 11/0772; G06F 11/1641
See application file for complete search history.

(56) References Cited

U.S. PATENT DOCUMENTS 6,305,760 B1 10/2001 Otake
2002/0063469 A1* 5/2002 Nishio .................. B60T 13/662
303/4

(Continued)

FOREIGN PATENT DOCUMENTS

JP 11-78922 A 3/1999
JP 2000-177556 A 6/2000
(Continued)

OTHER PUBLICATIONS

International Search Report, issued in PCT/JP2017/019842, PCT/ISA/210, dated Aug. 1, 2017.
(Continued)

*Primary Examiner* — Charles Ehne
(74) *Attorney, Agent, or Firm* — Birch, Stewart, Kolasch & Birch, LLP

(57) ABSTRACT

A failure diagnostic unit (144) obtains a control value for controlling an actuator (20) from each of a first processing circuit (11) and a second processing circuit (12) that are duplicated processing circuits. In a case where a first control value that has been obtained from the first processing circuit (11) does not match a second control value that has been obtained from the second processing circuit (12), the failure diagnostic unit (144) compares a state normal range with at least either the first control value or the second control value, and determines which of the first processing circuit (11) and the second processing circuit (12) an abnormality has occurred in, the state normal range being a range of a normal value of the control value that is estimated from a current (Continued)

operation state of a higher-order system that includes the actuator (20).

8 Claims, 11 Drawing Sheets

(51) Int. Cl.
*G07C 5/08* (2006.01)
*G06F 11/16* (2006.01)
*B60W 50/023* (2012.01)

(52) U.S. Cl.
CPC ...... *G06F 11/0751* (2013.01); *G06F 11/1641* (2013.01); *G07C 5/085* (2013.01); *G07C 5/0808* (2013.01); *B60W 50/023* (2013.01)

(56) References Cited

U.S. PATENT DOCUMENTS

| | | |
|---|---|---|
| 2009/0179777 A1 | 7/2009 | Ishikawa |
| 2010/0082200 A1 | 4/2010 | Ura |
| 2011/0221613 A1 | 9/2011 | Ishikawa |
| 2012/0048027 A1* | 3/2012 | Hashiguchi ............ B25J 13/085 73/763 |
| 2014/0365171 A1 | 12/2014 | Asano et al. |
| 2020/0023887 A1* | 1/2020 | Sasaki .................. B62D 5/0403 |

FOREIGN PATENT DOCUMENTS

| | | |
|---|---|---|
| JP | 2005-343183 A | 12/2005 |
| JP | 2006-228002 A | 8/2006 |
| JP | 2009-29172 A | 2/2009 |
| JP | 2009-166541 A | 7/2009 |
| JP | 2010-76637 A | 4/2010 |
| JP | 2012-45990 A | 3/2012 |
| JP | 2015-81013 A | 4/2015 |
| JP | 2015-182622 A | 10/2015 |
| JP | 2015-223868 A | 12/2015 |
| JP | 2017-8849 A | 1/2017 |
| WO | WO 2013/098944 A1 | 7/2013 |

OTHER PUBLICATIONS

International Search Report, issued in PCT/JP2018/017855, PCT/ISA/210, dated Jun. 12, 2018.

* cited by examiner

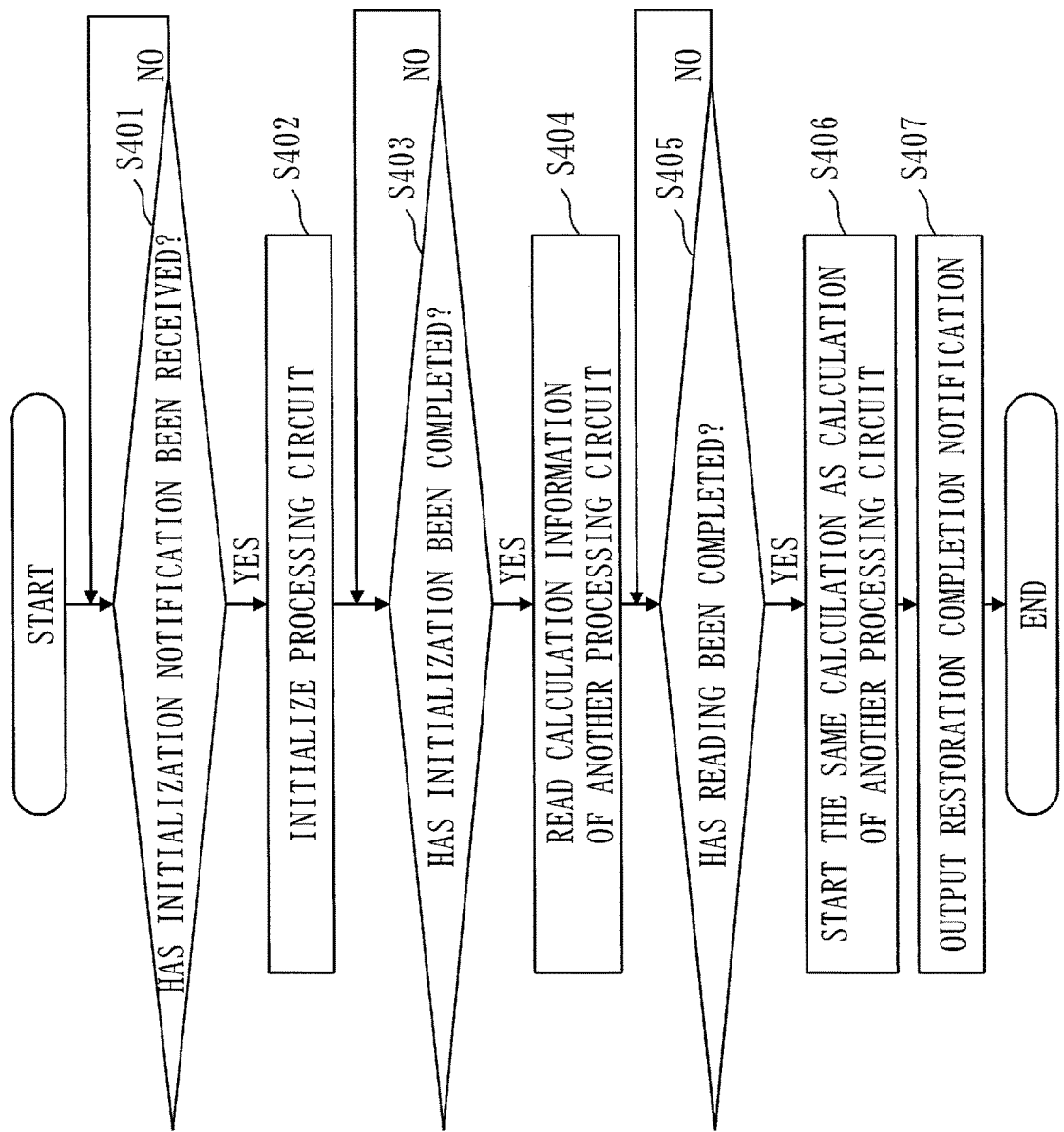

ABNORMALITY DETERMINATION APPARATUS, ABNORMALITY DETERMINATION METHOD, AND COMPUTER READABLE MEDIUM

TECHNICAL FIELD

The present invention relates to an abnormality determination apparatus, an abnormality determination method, and an abnormality determination program.

BACKGROUND ART

In a system in which it is requested that processing be continued even in a case where trouble such as a failure has occurred, a fault tolerant configuration is employed. In the fault tolerant configuration, processing circuits are made to be redundant. Then, even in a case where a failure has occurred in any of the processing circuits, a normal processing circuit continues an operation, so that desired processing is performed.

In the fault tolerant configuration, by comparing outputs of the respective processing circuits with each other, whether a failure has occurred in any of the processing circuits can be detected. Then, in the fault tolerant configuration, a processing circuit in which the occurrence of a failure has been detected is separated, and processing is continued by using a normal processing circuit.

In a configuration of triplicated processing circuits, a majority decision is made among outputs of the respective processing circuits, so that a processing circuit in which a failure has occurred can be specified.

In a configuration of duplicated processing circuits, in a case where outputs of the respective processing circuits do not match each other, it can be detected that a failure has occurred in any of the processing circuits. However, in the configuration of the duplicated processing circuits, it is difficult to specify which of the processing circuits the failure has occurred in.

In an application under severe conditions for a cost, such as a vehicle control system for automobiles, it is difficult to employ a configuration of triplicated processing circuits. In the application under severe conditions for a cost, as described above, there is a need to enable a processing circuit in which a failure has occurred to be specified in a configuration of duplicated processing circuits.

CITATION LIST

Patent Literature

Patent Literature 1: JP 2015-081013 A
Patent Literature 2: JP 2010-076637 A
Patent Literature 3: JP 2012-045990 A
Patent Literature 4: JP 2015-223868 A

SUMMARY OF INVENTION

Technical Problem

Patent Literature 1 discloses an electric power steering control device. The electric power steering control device of Patent Literature 1 includes two microcomputers. In Patent Literature 1, control values of the respective microcomputers are compared with each other. If a difference between the two control values is outside a predetermined range, it is determined that an abnormality has occurred in any of the microcomputers. In addition, in Patent Literature 1, a previous control value and a current control value are compared with each other for each of the microcomputers. Then, it is determined that an abnormality has occurred in a microcomputer that has a large difference between the previous control value and the current control value.

As described above, in Patent Literature 1, a microcomputer in which an abnormality has occurred is specified by only using a difference between a previous control value and a current control value. However, for example, in a case where sudden braking or sudden steering has occurred during the driving of a vehicle, there is a possibility that a control value that is significantly different from a previous control value will be output. In such a case, a microcomputer that has output the control value that is significantly different from the previous control value is a microcomputer that is operating normally.

In Patent Literature 1, in a situation where a control value significantly changes, as described above, there is a problem in which a microcomputer that is operating normally is erroneously determined to be a microcomputer in which an abnormality has occurred.

It is a principal object of the present invention to solve the problem described above. More specifically, it is a principal object of the present invention to achieve a configuration that enables a processing circuit in which an abnormality has occurred to be accurately determined even in a case where a control value significantly changes.

Solution to Problem

An abnormality determination apparatus according to the present invention includes:

a control value obtaining unit to obtain a control value for controlling a control target object from each of a first processing circuit and a second processing circuit that are duplicated processing circuits; and an abnormality determination unit to compare a state normal range with at least either a first control value or a second control value in a case where the first control value does not match the second control value, and to determine which of the first processing circuit and the second processing circuit an abnormality has occurred in, the first control value being obtained from the first processing circuit, the second control value being obtained from the second processing circuit, the state normal range being a range of a normal value of the control value that is estimated from a current operation state of a higher-order system that includes the control target object or a current operation state of the control target object.

Advantageous Effects of Invention

According to the present invention, a state normal range is used, so that even in a case where a control value significantly changes, a processing circuit in which an abnormality has occurred can be accurately determined.

BRIEF DESCRIPTION OF DRAWINGS

FIG. 11 is a diagram illustrating an operation example of a first processing circuit and a second processing circuit according to the fourth embodiment.

DESCRIPTION OF EMBODIMENTS

Embodiments of the present invention are described below with reference to the drawings. In the description of embodiments described below and the drawings, a part denoted by an identical reference sign indicates an identical part or an equivalent part.

First Embodiment

*Description of Configuration*

Figure 1:
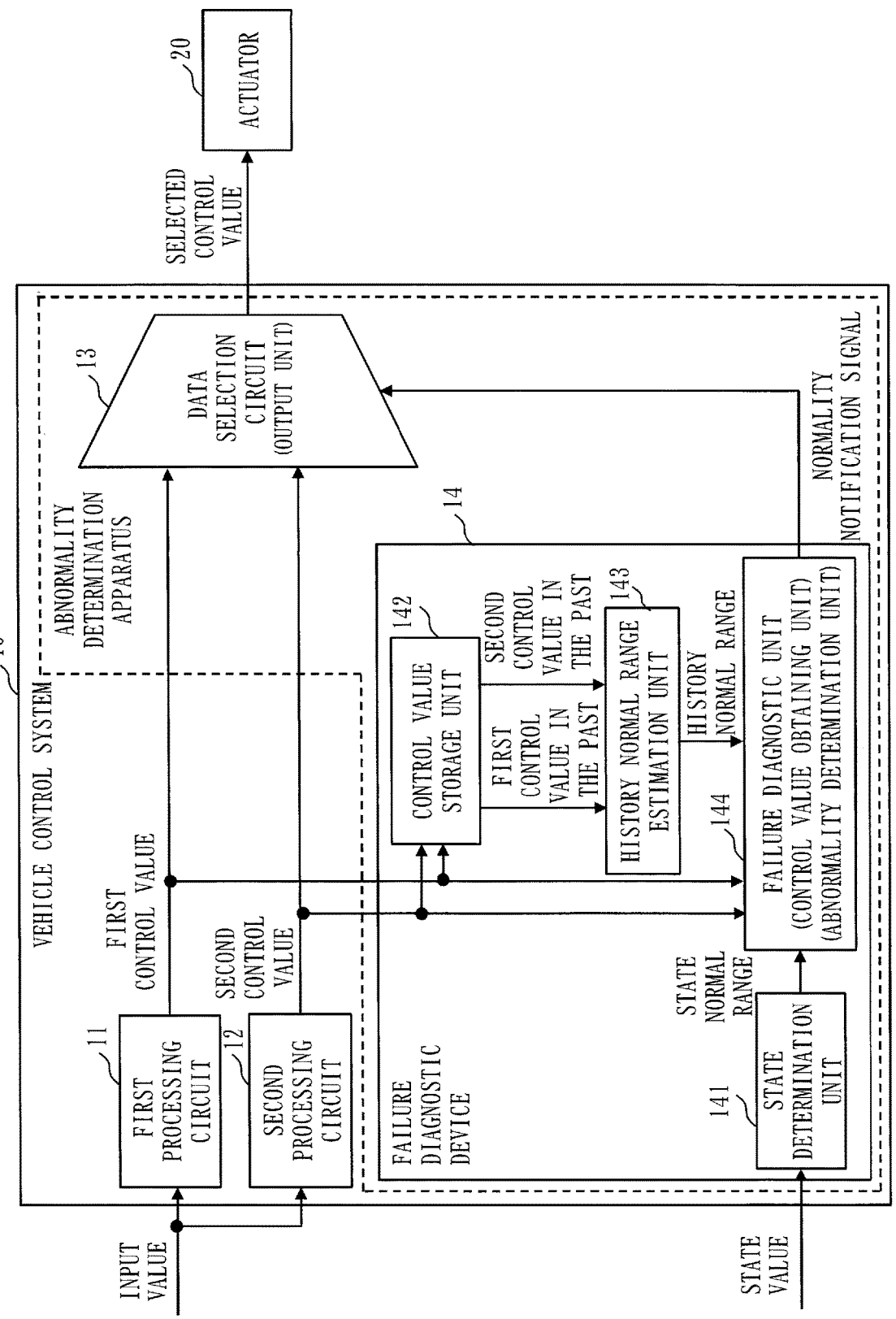
FIG. 1 is a diagram illustrating a configuration example of a vehicle control system according to a first embodiment.

FIG. 1 illustrates a configuration example of a vehicle control system 10 according to the present embodiment.

The vehicle control system 10 controls an actuator 20. The actuator 20 is an actuator of a brake, an engine, a motor, a steering, or the like.

The vehicle control system 10 is configured by a first processing circuit 11, a second processing circuit 12, a data selection circuit 13, and a failure diagnostic device 14.

The first processing circuit 11 and the second processing circuit 12 are configured by a microcomputer, or a microcomputer and a memory.

The data selection circuit 13 and the failure diagnostic device 14 are implemented by a processing circuit. Specifically, the processing circuit is a large-scale integrated circuit (LSI). The LSI is, for example, a field-programmable gate array (FPGA). Alternatively, the LSI may be a complex programmable logic device (CPLD) or an application specific integrated circuit (ASIC).

The data selection circuit 13 and the failure diagnostic device 14 may be implemented by LSIs that are different from each other, or may be implemented by a single LSI.

The first processing circuit 11 and the second processing circuit 12 are duplicated processing circuits.

Each of the first processing circuit 11 and the second processing circuit 12 generates a control value for controlling the actuator 20. The actuator 20 is equivalent to a control target object.

The control value generated by the first processing circuit 11 is referred to as a first control value. In addition, the control value generated by the second processing circuit 12 is referred to as a second control value.

The data selection circuit 13 selects a control value from a processing circuit that is operating normally from among the first control value and the second control value, and outputs the selected control value to the actuator 20. The data selection circuit 13 can determine the processing circuit that is operating normally on the basis of a normality notification signal from a failure diagnostic unit 144 described later.

The data selection circuit 13 is equivalent to an output unit.

The failure diagnostic device 14 determines a processing circuit that is operating normally and a processing circuit in which an abnormality has occurred.

The failure diagnostic device 14 is configured by a state determination unit 141, a control value storage unit 142, a history normal range estimation unit 143, and the failure diagnostic unit 144.

The state determination unit 141 obtains a state value that indicates a current operation state of a higher-order system that includes the actuator 20. Then, the state determination unit 141 estimates a state normal range on the basis of the obtained state value, and outputs the state normal range to the failure diagnostic unit 144. The state normal range is a range of a normal value of a control value that is estimated from the current operation state of the higher-order system. The higher-order system is a vehicle that includes the vehicle control system 10 and the actuator 20 in the present embodiment.

Stated another way, the state determination unit 141 estimates, as the state normal range, a range of a normal value that conforms to a current state of a vehicle serving as the higher-order system on the basis of the state value.

The state determination unit 141 obtains a state value that indicates an operation state of the vehicle from a sensor or the like that is located outside the vehicle control system 10. The state value indicates a state of the vehicle, such as the vehicle travelling in a parking lot or the vehicle climbing a slope. In addition, the state value may indicate a state where the vehicle is travelling on an expressway, a state where the vehicle is travelling on an ordinary road, or another state. Further, the state value may indicate a state where a collision preventing function is operating, or another state.

In addition, the state determination unit 141 may obtain a state value that indicates a current operation state of the actuator 20, and may estimate, as the state normal range, a range of a normal value of a control value that is estimated from the current operation state of the actuator 20.

Every time a first control value is output from the first processing circuit 11, the control value storage unit 142 stores the output first control value. In addition, every time a second control value is output from the second processing circuit 12, the control value storage unit 142 stores the output second control value. Therefore, in the control value storage unit 142, a plurality of first control values in the past are stored, and a plurality of second control values in the past are stored.

The history normal range estimation unit 143 estimates a range of a normal value of a control value on the basis of the plurality of first control values in the past that are stored in the control value storage unit 142. The range of the normal value of the control value that is estimated by the control value storage unit 142 is referred to as a history normal range.

The history normal range estimation unit 143 may estimate the history normal range on the basis of the plurality of second control values in the past that are stored in the control value storage unit 142.

The failure diagnostic unit 144 obtains the first control value from the first processing circuit 11, and obtains the second control value from the second processing circuit 12.

In addition, the failure diagnostic unit 144 compares the first control value with the second control value. In a case where the first control value does not match the second control value, the failure diagnostic unit 144 obtains the state normal range from the state determination unit 141, and obtains the history normal range from the history normal range estimation unit 143. Then, the failure diagnostic unit 144 compares the state normal range with at least either the first control value or the second control value, and determines which of the first processing circuit 11 and the second processing circuit 12 an abnormality has occurred in.

More specifically, the failure diagnostic unit 144 compares the state normal range with the first control value, and determines that an abnormality has occurred in the first processing circuit, in a case where the first control value deviates from the state normal range. In contrast, in a case where the first control value is within the state normal range, the failure diagnostic unit 144 compares the state normal range with the second control value. In a case where the second control value deviates from the state normal range, the failure diagnostic unit 144 determines that an abnormality has occurred in the second processing circuit. In contrast, in a case where the second control value is within the state normal range, the failure diagnostic unit 144 compares the history normal range with the first control value. As a result, in a case where the first control value deviates from the history normal range, the failure diagnostic unit 144 determines that an abnormality has occurred in the first processing circuit 11. In addition, in a case where the first control value is within the history normal range, the failure diagnostic unit 144 determines that an abnormality has occurred in the second processing circuit 12.

The failure diagnostic unit 144 outputs, to the data selection circuit 13, a normality notification signal that notifies of a processing circuit that has been determined to be normal.

The failure diagnostic unit 144 is equivalent to a control value obtaining unit and an abnormality determination unit. In addition, processing performed by the failure diagnostic unit 144 is equivalent to control value obtaining processing and abnormality determination processing.

As illustrated in FIG. 1, the data selection circuit 13 and the failure diagnostic device 14 are equivalent to an abnormality determination apparatus. In addition, operations performed in the data selection circuit 13 and the failure diagnostic device 14 are equivalent to an abnormality determination method.

*Description of Operation*

Next, an outline of an operation of the vehicle control system 10 according to the present embodiment is described.

Here, an example is assumed where the first processing circuit 11 and the second processing circuit 12 have been in a normal state in an initial state but an abnormality has occurred in the first processing circuit 11 later.

In an initial state, the first processing circuit 11 and the second processing circuit 12 are in a normal state. Therefore, the failure diagnostic device 14 outputs, to the data selection circuit 13, for example, a normality notification signal that notifies that the first processing circuit 11 is in a normal state. The data selection circuit 13 selects a first control value from the first processing circuit 11, and outputs the selected first control value to the actuator 20.

When an abnormality has occurred in the first processing circuit 11, the first control value becomes an abnormal value. Therefore, the failure diagnostic device 14 determines that the second processing circuit 12 is in a normal state but the first processing circuit 11 is in an abnormal state. Then, the failure diagnostic device 14 outputs, to the data selection circuit 13, a normality notification signal that notifies that the second processing circuit 12 is in a normal state. The data selection circuit 13 discards the first control value from the first processing circuit 11 on the basis of the normality notification signal, and outputs, to the actuator 20, a second control value from the second processing circuit 12.

Figure 2:
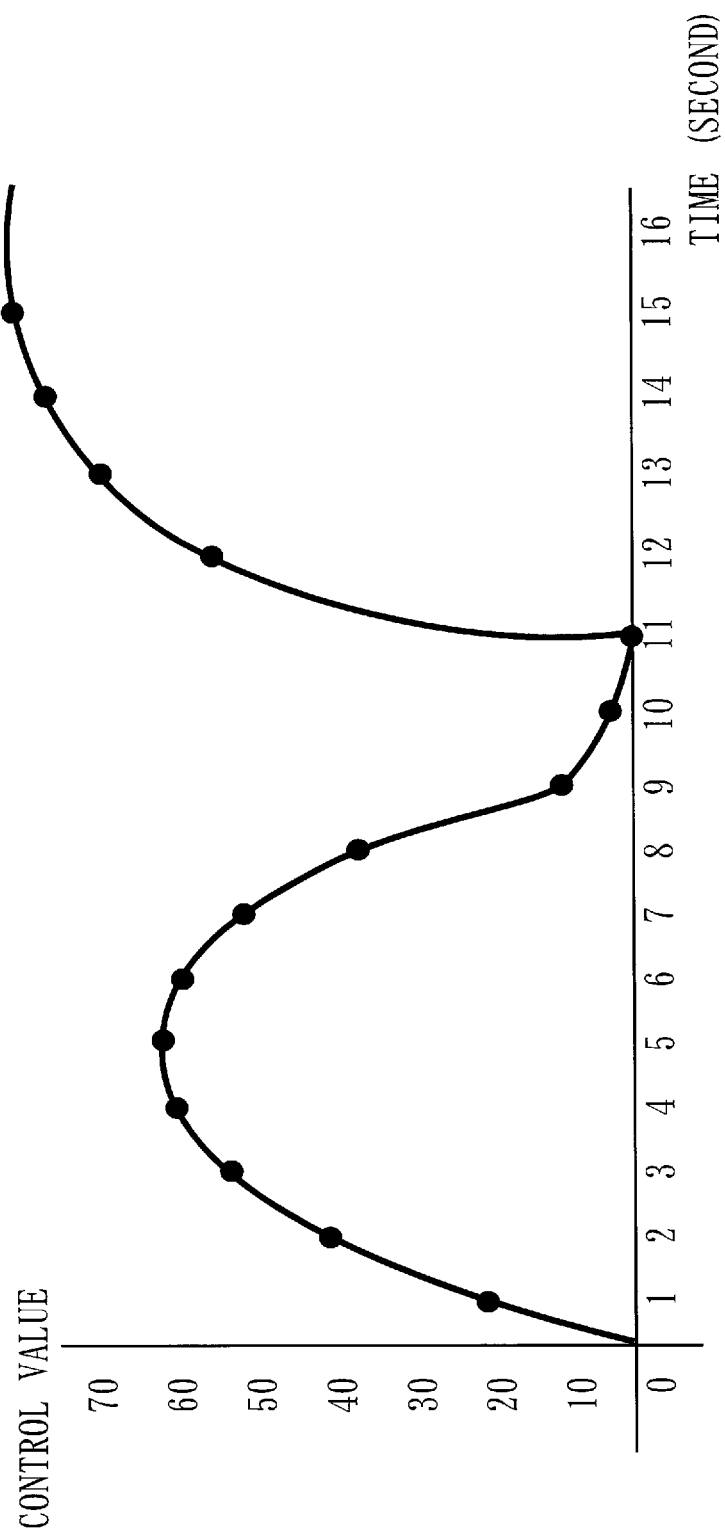
FIG. 2 is a diagram illustrating an example of a temporal change in a second control value according to the first embodiment.

FIG. 2 illustrates an example of a temporal change in a normal control value. In FIG. 2, an example is illustrated where the second control value is output once a second.

First, assume that a mismatch between the first control value and the second control value has occurred at 6 seconds. Stated another way, the first control value matches the second control value from 0 seconds to 5 seconds, and the first control value and the second control value are as illustrated in FIG. 2. Here, attention is paid to a value that is one ahead (at 5 seconds), a value that is two ahead (at 4 seconds), and a value that is three ahead (at 3 seconds). A value at 3 seconds is 56, a value at 4 seconds is 61, and a value at 5 seconds is 63. A change in a value from 3 seconds to 4 seconds is +5, and a change in a value from 4 seconds to 5 seconds is +2. As described above, a change in a value is relatively small during a period from 3 seconds to 5 seconds, and therefore it can be estimated that a value at 6 seconds will fall within a range of ±5 with respect to the value at 5 seconds.

According to the estimation above, the history normal range estimation unit 143 estimates a range of ±5 from the value at 5 seconds as a history normal range of the value at 6 seconds.

In a case where a control value at 6 seconds deviates from a range of ±5 from a control value at 5 seconds, the failure diagnostic unit 144 determines that the control value at 6 seconds has an abnormality.

Next, assume that a mismatch between the first control value and the second control value has occurred at 9 seconds. Stated another way, the first control value matches the second control value from 0 seconds to 8 seconds, and the first control value and the second control value are as illustrated in FIG. 2. Here, attention is paid to a value that is one ahead (at 8 seconds), a value that is two ahead (at 7 seconds), and a value that is three ahead (at 6 seconds). A value at 6 seconds is 60, a value at 7 seconds is 50, and a value at 8 seconds is 30. A change in a value 6 seconds to 7 seconds is −10, and a change in a value from 7 seconds to 8 seconds is −20. As described above, a change in a value from 6 seconds to 8 seconds is larger than a change in a value from 3 seconds to 6 seconds. Therefore, it can be estimated that a value at 9 seconds will fall within a range of ±30 with respect to the value at 8 seconds.

According to the estimation above, the history normal range estimation unit 143 estimates a range of ±30 from the value at 8 seconds as a history normal range of the value at 9 seconds.

In a case where a control value at 9 seconds deviates from a range of ±30 from a control value at 8 seconds, the failure diagnostic unit 144 determines that the control value at 9 seconds has an abnormality.

As described above, the history normal range estimation unit 143 can estimate a range of a normal value as the history normal range on the basis of control values for several times in the past. Then, the failure diagnostic unit 144 can determine a processing circuit in which an abnormality has occurred on the basis of the history normal range. However, in determination only using the history normal range, in a case where the control value has suddenly changed in such a way that the control value significantly deviates from a change in the control value in the past, the failure diagnostic unit 144 erroneously recognizes a normal value as an abnormal value, and determines that a processing circuit that is operating normally is in an abnormal state.

A case is examined where a mismatch between the first control value and the second control value has occurred at 12 seconds in FIG. 2. Stated another way, the first control value matches the second control value from 0 seconds to 11 seconds, and the first control value and the second control value are as illustrated in FIG. 2. Here, a value that is one ahead (at 11 seconds) is 0, a value that is two ahead (at 10 seconds) is 3, and a value that is three ahead (at 9 seconds) is 10. A change in a value from 9 seconds to 10 seconds is −7, and a change in a value from 10 seconds to 11 seconds is −3. Therefore, it can be estimated that a value at 12 seconds will fall within a range of ±10 with respect to a value at 11 seconds.

According to the estimation above, the history normal range estimation unit 143 estimates a range of +10 from the value at 11 seconds as a history normal range of the value at 12 seconds.

However, the value at 12 seconds is 56, and therefore the value does not fall within a range of ±10 from the value at 11 seconds. Accordingly, a value of 56 at 12 seconds is a normal value, but deviates from the history normal range. Therefore, the failure diagnostic unit 144 erroneously determines this 56 as an abnormal value.

In order to prevent the erroneous determination described above, in the present embodiment, the state determination unit 141 estimates the state normal range, and the failure diagnostic unit 144 determines whether the first control value and the second control value are normal, by using the state normal range.

For example, there is a characteristic by which the probability of the occurrence of sudden acceleration is low while a vehicle is travelling in a parking lot. Therefore, the state determination unit 141 estimates a state normal range according to this characteristic. Additionally, for example, there is a characteristic by which the probability of the occurrence of sudden acceleration is high while a vehicle is climbing a slope. Therefore, the state determination unit 141 estimates a state normal range according to this characteristic. Further, for example, there is a characteristic by which the probability of the occurrence of sudden steering is low while a vehicle is travelling on an expressway. Therefore, the state determination unit 141 estimates a state normal range according to this characteristic. As described above, the state determination unit 141 estimates a state normal range that conforms to a state of a vehicle.

The state determination unit 141 can accurately estimate a state normal range for each state of a vehicle by holding a typical value of a control value for each of the states of the vehicle.

As described above, the failure diagnostic device 14 according to the present embodiment specifies a processing circuit in which an abnormality has occurred, by combining the history normal range with the state normal range.

Next, details of an operation of the failure diagnostic device 14 according to the present embodiment are described.

Figure 3:
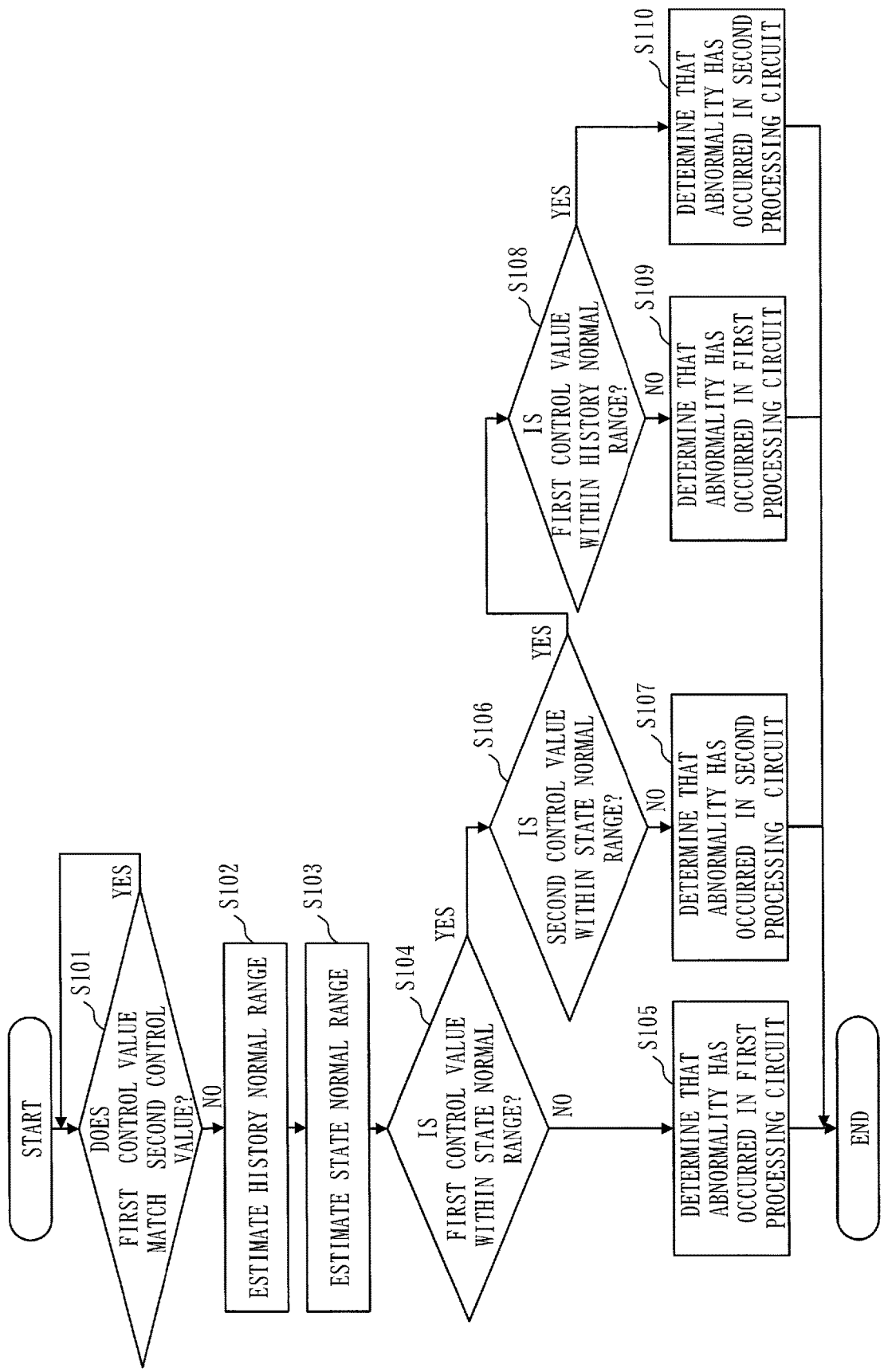
FIG. 3 is a diagram illustrating an operation example of a failure diagnostic circuit according to the first embodiment.

FIG. 3 is a flowchart illustrating an operation example of the failure diagnostic device 14.

The failure diagnostic unit 144 obtains a first control value from the first processing circuit 11, and obtains a second control value from the second processing circuit 12.

Then, the failure diagnostic unit 144 compares the first control value with the second control value (step S101).

In a case where the first control value does not match the second control value (NO in step S101), the failure diagnostic unit 144 instructs the history normal range estimation unit 143 to estimate a history normal range, and the history normal range estimation unit 143 estimates the history normal range (step S102). Then, the history normal range estimation unit 143 notifies the history normal range to the failure diagnostic unit 144.

Next, the failure diagnostic unit 144 instructs the state determination unit 141 to estimate a state normal range, and the state determination unit 141 estimates the state normal range (step S103). Then, the state determination unit 141 notifies the state normal range to the failure diagnostic unit 144.

The order of step S102 and step S103 may be reversed.

Next, the failure diagnostic unit 144 compares the first control value with the state normal range (step S104).

In a case where the first control value deviates from the state normal range (NO in step S104), the failure diagnostic unit 144 determines that an abnormality has occurred in the first processing circuit 11 (step S105). Then, the failure diagnostic unit 144 outputs, to the data selection circuit 13, a normality notification signal that notifies that the second processing circuit 12 is operating normally.

In contrast, if the first control value is within the state normal range (YES in step S104), the failure diagnostic unit 144 next compares the second control value with the state normal range (step S106).

In a case where the second control value deviates from the state normal range (NO in step S106), the failure diagnostic unit 144 determines that an abnormality has occurred in the second processing circuit 12 (step S107). Then, the failure diagnostic unit 144 outputs, to the data selection circuit 13, a normality notification signal that notifies that the first processing circuit 11 is operating normally.

If the second control value is within the state normal range (YES in step S106), the failure diagnostic unit 144 next compares the first control value with the history normal range (step S108).

In a case where the first control value deviates from the history normal range (NO in step S108), the failure diagnostic unit 144 determines that an abnormality has occurred in the first processing circuit 11 (step S109). Then, the failure diagnostic unit 144 outputs, to the data selection circuit 13, a normality notification signal that notifies that the second processing circuit 12 is operating normally.

In contrast, if the first control value is within the history normal range (YES in step S108), the failure diagnostic unit 144 determines that an abnormality has occurred in the second processing circuit 12 (step S110). Then, the failure diagnostic unit 144 outputs, to the data selection circuit 13, a normality notification signal that notifies that the first processing circuit 11 is operating normally.

\*\*\*Description of Advantageous Effects of Embodiment\*\*\*

In the present embodiment, a state normal range is estimated according to a state (a state of travelling in a parking lot, a state of climbing a slope, a state of travelling on an expressway, or another state) of a vehicle, and a processing circuit in which an abnormality has occurred is determined by using the state normal range. Therefore, according to the present embodiment, even in a case where a control value significantly changes according to the state of the vehicle, a processing circuit in which an abnormality has occurred can be accurately determined.

Second Embodiment

Figure 4:
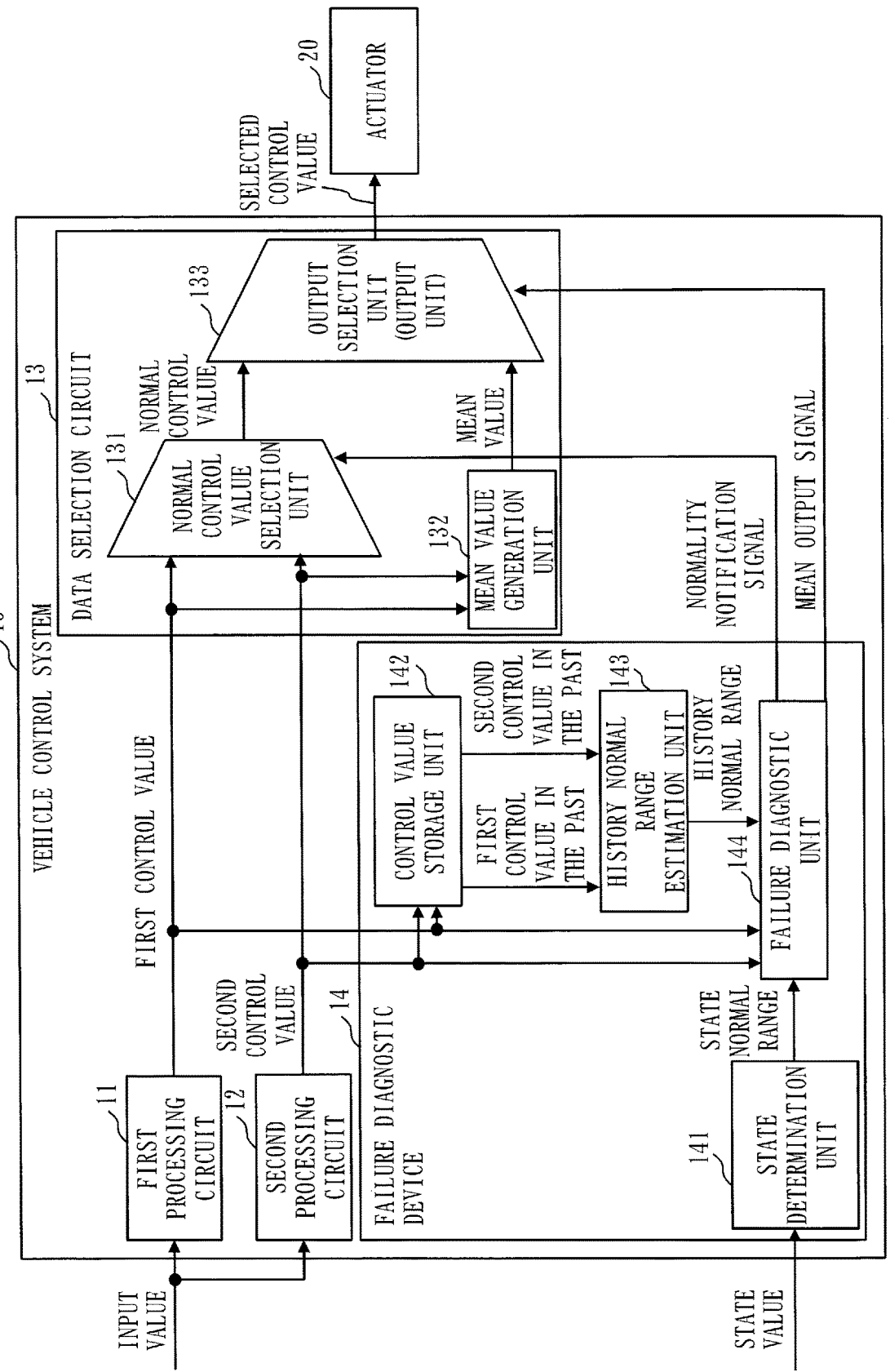
FIG. 4 is a diagram illustrating a configuration example of a vehicle control system according to a second embodiment.

FIG. 4 illustrates a configuration example of a vehicle control system 10 according to the present embodiment. The vehicle control system 10 of FIG. 4 is different from the vehicle control system 10 illustrated in FIG. 1, and a data selection circuit 13 is configured by a normal control value selection unit 131, a mean value generation unit 132, and an output selection unit 133.

The normal control value selection unit 131 selects a normal control value from among a first control value and a second control value in accordance with a normality notification signal from the failure diagnostic unit 144. Then, the normal control value selection unit 131 outputs the selected control value to the output selection unit 133.

The mean value generation unit 132 generates a mean value of the first control value and the second control value, and outputs the generated mean value to the output selection unit 133.

The output selection unit 133 selects a control value to be output to the actuator 20 from among the control value output from the normal control value selection unit 131 and the mean value output from the mean value generation unit 132. More specifically, in a case where a mean output signal has been output from the failure diagnostic unit 144, the output selection unit 133 outputs, to the actuator 20, the mean value from the mean value generation unit 132.

In the present embodiment, in a case where the failure diagnostic unit 144 has performed evaluation by using a state normal range and a history normal range, and has determined that no abnormality has occurred in either the first processing circuit 11 or the second processing circuit 12, the failure diagnostic unit 144 outputs the mean output signal to the output selection unit 133.

For example, in a case where a first control value does not match the second control value at 6 seconds in FIG. 2, if a vehicle is in a state of travelling in a parking lot, it is estimated that a value at 6 seconds will fall within a range of ±5 with respect to a value at 5 seconds. In this case, in a case where both the first control value and the second control value fall within a range of ±5, the failure diagnostic unit 144 determines that no abnormality has occurred in either the first processing circuit 11 or the second processing circuit 12. Then, the failure diagnostic unit 144 outputs a mean output signal to the output selection unit 133.

In the present embodiment, the output selection unit 133 is equivalent to the output unit.

In addition, the data selection circuit 13 and the failure diagnostic device 14 are equivalent to the abnormality determination apparatus similarly to the first embodiment, although this is not illustrated in FIG. 4. Further, the failure diagnostic unit 144 is equivalent to the control value obtaining unit and the abnormality determination unit.

Figure 5:
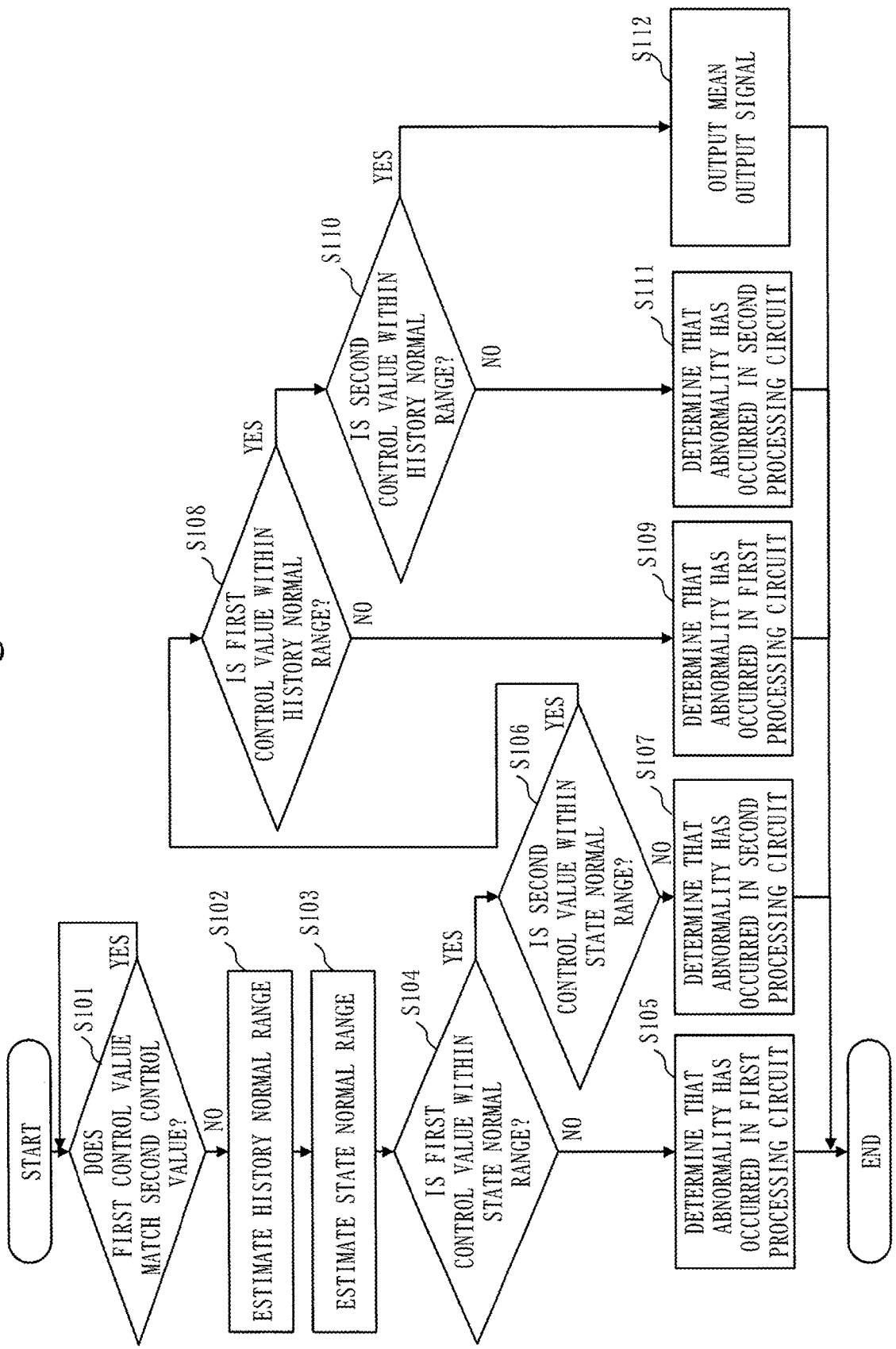
FIG. 5 is a diagram illustrating an operation example of a failure diagnostic circuit according to the second embodiment.

FIG. 5 illustrates an operation example of the failure diagnostic device 14 according to the present embodiment.

In FIG. 5, step S101 to step S109 are the same as those illustrated in FIG. 3, and therefore a description is omitted.

In step S108, if the first control value is within the history normal range (YES in step S108), the failure diagnostic unit 144 compares the second control value with the history normal range (step S110).

In a case where the second control value deviates from the history normal range (NO in step S110), the failure diagnostic unit 144 determines that an abnormality has occurred in the second processing circuit 12 (step S111). Then, the failure diagnostic unit 144 outputs, to the data selection circuit 13, a normality notification signal that notifies that the first processing circuit 11 is operating normally.

In contrast, if the second control value is within the history normal range (YES in step S110), the failure diagnostic unit 144 determines that no abnormality has occurred in either the first processing circuit 11 or the second processing circuit 12. Then, the failure diagnostic unit 144 outputs a mean output signal to the output selection unit 133 (step S112).

In a case where no abnormality has occurred in either the first processing circuit 11 or the second processing circuit 12, it is not clear which of the first control value and the second control value is a correct value.

In the present embodiment, by outputting a mean value of the first control value and the second control value, a risk of controlling the actuator 20 by using an incorrect value is reduced.

Third Embodiment

*Description of Configuration*

Figure 7:
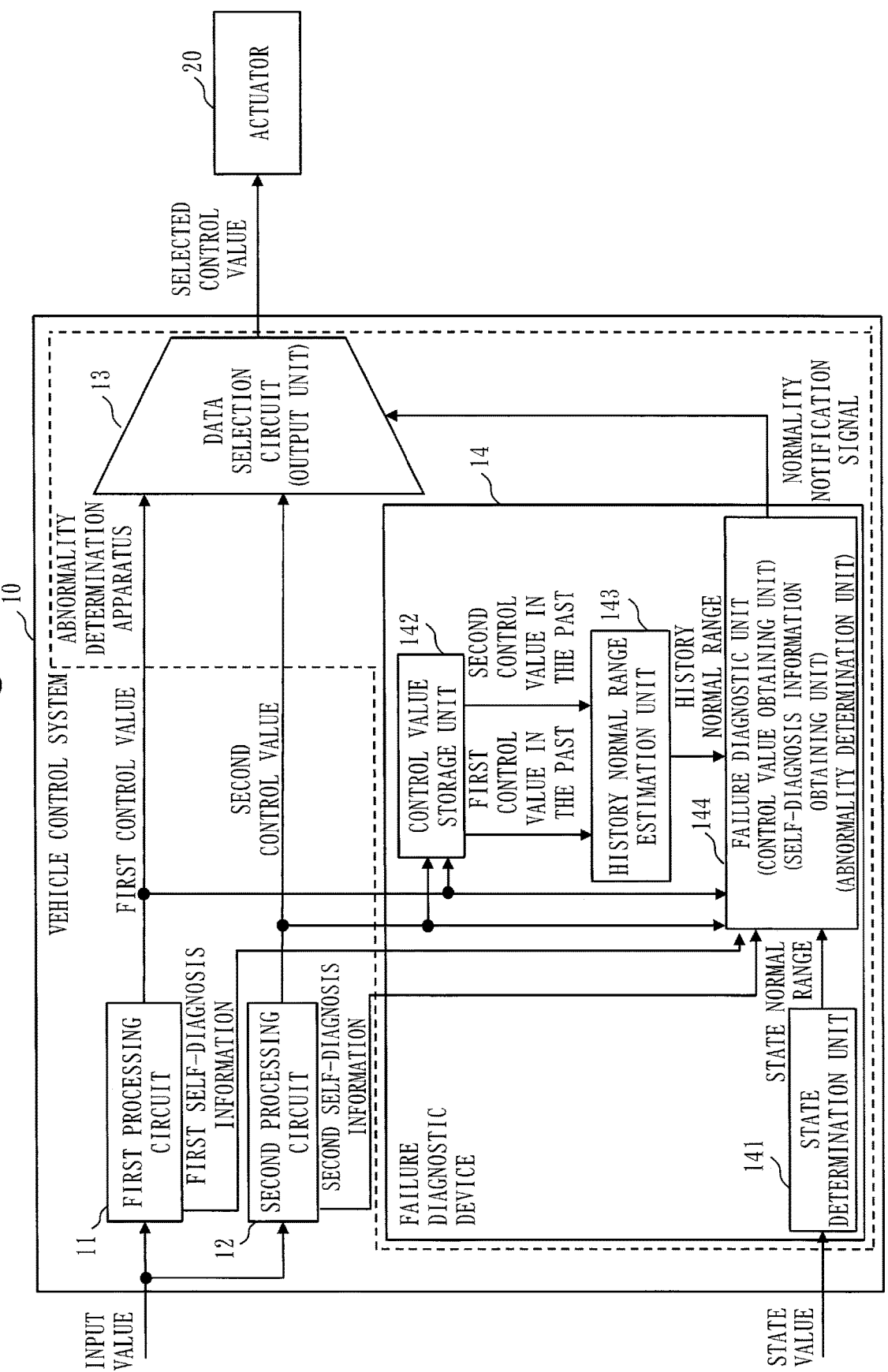
FIG. 7 is a diagram illustrating a configuration example of a vehicle control system according to a third embodiment.

FIG. 7 illustrates a configuration example of a vehicle control system 10 according to the present embodiment. In the vehicle control system 10 of FIG. 7, the failure diagnostic unit 144 obtains first self-diagnosis information that is output from the first processing circuit 11 and second self-diagnosis information that is output from the second processing circuit 12. Then, the failure diagnostic unit 144 uses the first self-diagnosis information and the second self-diagnosis information to diagnose an abnormality.

Thus, in the present embodiment, the failure diagnostic unit 144 is equivalent to the control value obtaining unit, the abnormality determination unit, and a self-diagnosis information obtaining unit.

In addition, in the present embodiment, the first processing circuit 11 and the second processing circuit 12 are microcomputers or central processing units (CPUs) that have a self-diagnosis function that corresponds to functional safety (IEC 61508, ISO 26262, or the like).

In the present embodiment, the first processing circuit 11 and the second processing circuit 12 can perform, for example, a bit inversion checking function, a background intelligent transfer service (BIST) function, a clock period inspecting function, a voltage inspecting function, a temperature inspecting function, and a dual-core lock step function as the self-diagnosis function.

In the bit inversion checking function, the presence or absence of bit inversion of a memory is inspected.

In the BIST function, a test value is input to each of functions in a processing circuit (a microcomputer or a CPU), it is determined whether an operation of each of the functions after an input matches an expected value, and the normality/abnormality of the processing circuit is inspected.

In the clock period inspecting function, it is detected that a clock frequency input to a processing circuit (a microcomputer or a CPU) does not satisfy a rated value.

In the voltage inspecting function, it is detected that a voltage input to a processing circuit (a microcomputer or a CPU) does not satisfy a rated value of the processing circuit.

In the temperature inspecting function, it is detected that a current temperature does not satisfy a rated temperature of a processing circuit (a microcomputer or a CPU).

In the dual-core lock step function, it is inspected whether duplicated arithmetic circuits in a processing circuit (a microcomputer or a CPU) perform the same operation in each clock.

The other elements in FIG. 7 are similar to those illustrated in FIG. 1, and therefore a description is omitted.

In the present embodiment, a difference from the first embodiment is principally described.

Note that matters that are not described below are similar to matters in the first embodiment.

*Description of Operation*

Figure 8:
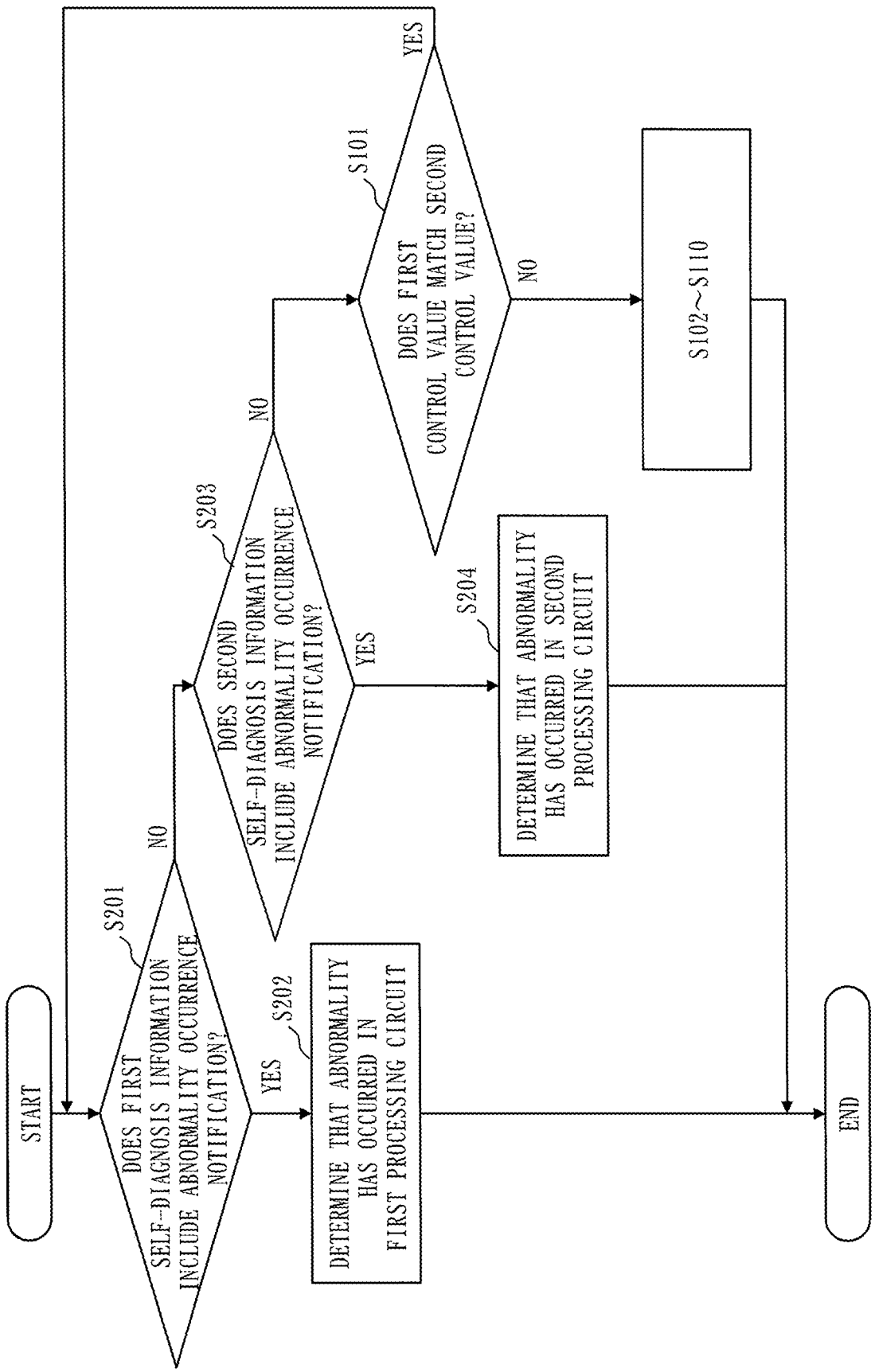
FIG. 8 is a diagram illustrating an operation example of a failure diagnostic circuit according to the third embodiment.

FIG. 8 illustrates an operation example of a failure diagnostic device 14 according to the present embodiment.

The failure diagnostic unit 144 obtains first self-diagnosis information that is output from the first processing circuit 11 and second self-diagnosis information that is output from the second processing circuit 12.

The first self-diagnosis information indicates a result of self-diagnosis that has been performed by using a self-diagnosis function of the first processing circuit 11. The second self-diagnosis information indicates a result of self-diagnosis that has been performed by using a self-diagnosis function of the second processing circuit 12. The first processing circuit 11 continuously outputs the first self-diagnosis information. In addition, the second processing circuit 12 continuously outputs the second self-diagnosis information.

The failure diagnostic unit 144 analyzes the first self-diagnosis information, and determines whether the first self-diagnosis information includes an abnormality occurrence notification (step S201). The abnormality occurrence notification of the first self-diagnosis information is information that notifies of the occurrence of an abnormality in the first processing circuit 11.

In a case where the first self-diagnosis information includes the abnormality occurrence notification (YES in step S201), the failure diagnostic unit 144 determines that an abnormality has occurred in the first processing circuit 11 (step S202).

In a case where the first self-diagnosis information does not include the abnormality occurrence notification (NO in step S201), the failure diagnostic unit 144 analyzes the second self-diagnosis information, and determines whether the second self-diagnosis information includes an abnormality occurrence notification (step S203). The abnormality occurrence notification of the second self-diagnosis information is information that notifies of the occurrence of an abnormality in the second processing circuit 12.

In a case where the second self-diagnosis information includes the abnormality occurrence notification (YES in step S203), the failure diagnostic unit 144 determines that an abnormality has occurred in the second processing circuit 12 (step S204).

In a case where the second self-diagnosis information does not include the abnormality occurrence notification (NO in step S203), the failure diagnostic unit 144 obtains the first control value from the first processing circuit 11, obtains the second control value from the second processing circuit 12, and compares the first control value with the second control value (step S101).

In a case where the first control value does not match the second control value (NO in step S101), the failure diagnostic unit 144 performs the processes of step S102 to step S110 illustrated in FIG. 3.

In contrast, in a case where the first control value matches the second control value (YES in step S101), the failure diagnostic unit 144 performs the process of step S201 and processes that follow.

*Description of Advantageous Effects of Embodiment*

In the present embodiment, if self-diagnosis information includes an abnormality occurrence notification, it can be determined that an abnormality has occurred in a processing device being an output source of the self-diagnosis information. Stated another way, if the self-diagnosis information includes the abnormality occurrence notification, the processing illustrated in the first embodiment and the second embodiment can be omitted. As described above, according to the present embodiment, an abnormality of a processing circuit can be determined more efficiently than in the first embodiment and the second embodiment.

Fourth Embodiment

*Description of Configuration*

Figure 9:
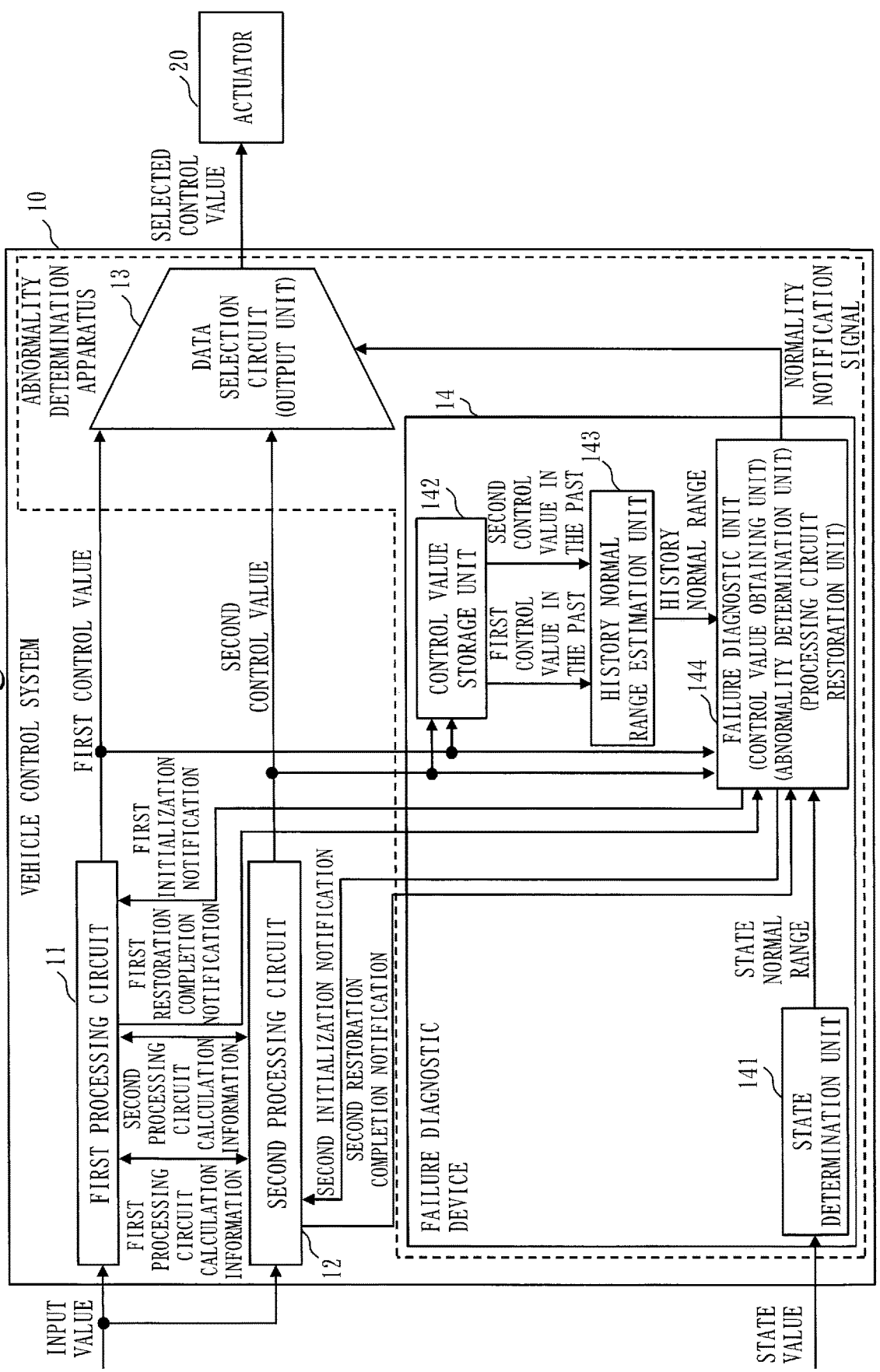
FIG. 9 is a diagram illustrating a configuration example of a vehicle control system according to a fourth embodiment.

FIG. 9 illustrates a configuration example of a vehicle control system 10 according to the present embodiment. In the vehicle control system 10 of FIG. 9, when an abnormality has occurred in the first processing circuit 11 or the second processing circuit 12, the failure diagnostic unit 144 outputs an initialization notification to a processing circuit in which an abnormality has occurred. The initialization notification is information that causes the processing circuit in which an abnormality has occurred to perform initialization processing. An initialization notification that the failure diagnostic unit 144 outputs to the first processing circuit 11 is referred to as a first initialization notification. In addition, an initialization notification that the failure diagnostic unit 144 outputs to the second processing circuit 12 is referred to as a second initialization notification.

Further, the failure diagnostic unit 144 obtains a restoration completion notification from a processing circuit being an output destination of the initialization notification. The restoration completion notification is information that notifies that the processing circuit being the output destination of the initialization notification has been restored to a normal state, after the initialization processing and when the processing circuit being the output destination of the initialization notification has become able to perform the same calculation as calculation of another processing circuit by using calculation information obtained from the other processing circuit. A restoration completion notification that the first processing circuit 11 outputs is referred to as a first restoration completion notification. In addition, a restoration completion notification that the second processing circuit 12 outputs is referred to as a second restoration completion notification.

In the present embodiment, the failure diagnostic unit 144 is equivalent to the control value obtaining unit, the abnormality determination unit, and a processing circuit restoration unit.

In addition, in the present embodiment, after the initialization processing, the first processing circuit 11 obtains second processing circuit calculation information from the second processing circuit 12. The second processing circuit calculation information notifies of a current calculation state of the second processing circuit 12. The first processing circuit 11 starts the same calculation as calculation of the second processing circuit 12 by using the second processing circuit calculation information. When the first processing circuit 11 has become able to perform the same calculation as calculation of the second processing circuit 12, the first processing circuit 11 outputs the first restoration completion notification to the failure diagnostic unit 144.

After the initialization processing, the second processing circuit 12 obtains first processing circuit calculation information from the first processing circuit 11. The first processing circuit calculation information notifies of a current calculation state of the first processing circuit 11. The second processing circuit 12 starts the same calculation as calculation of the first processing circuit 11 by using the first processing circuit calculation information. When the second processing circuit 12 has become able to perform the same calculation as calculation of the first processing circuit 11, the second processing circuit 12 outputs the second restoration completion notification to the failure diagnostic unit 144.

The other elements in FIG. 9 are similar to the elements illustrated in FIG. 1, and therefore a description is omitted.

In the present embodiment, a difference from the first embodiment is principally described.

Note that matters that are not described below are similar to matters in the first embodiment.

*Description of Operation*

Figure 10:
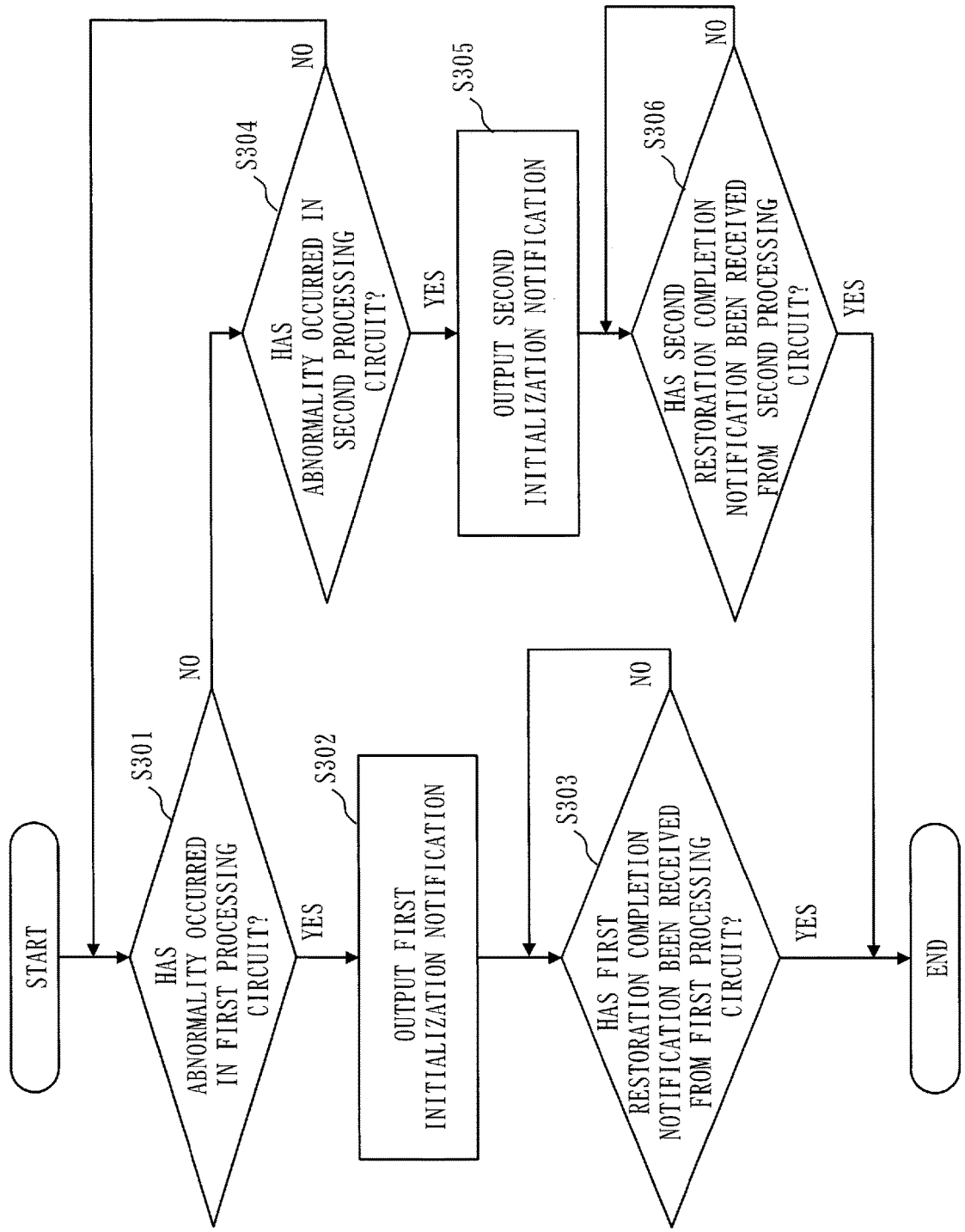
FIG. 10 is a diagram illustrating an operation example of a failure diagnostic circuit according to the fourth embodiment.

FIG. 10 illustrates an operation example of a failure diagnostic device 14 according to the present embodiment.

More specifically, FIG. 10 illustrates an operation example of the failure diagnostic unit 144 after an abnormality of the first processing circuit 11 or the second processing circuit 12 has been detected.

In a case where the failure diagnostic unit 144 has detected that an abnormality has occurred in the first processing circuit 11, by using a method according to any of the first embodiment, the second embodiment, and the third embodiment (YES in step S301), the failure diagnostic unit 144 outputs the first initialization notification to the first processing circuit 11 (step S302).

Then, the failure diagnostic unit 144 awaits the reception of the first restoration completion notification from the first processing circuit 11. In a case where the failure diagnostic unit 144 has received the first restoration completion notification from the first processing circuit 11 (YES in step S303), the failure diagnostic unit 144 terminates the processing.

In addition, in a case where the failure diagnostic unit 144 has detected that an abnormality has occurred in the second processing circuit 12, by using a method according to any of the first embodiment, the second embodiment, and the third embodiment (YES in step S304), the failure diagnostic unit 144 outputs the second initialization notification to the second processing circuit 12 (step S305).

Then, the failure diagnostic unit 144 awaits the reception of the second restoration completion notification from the second processing circuit 12. In a case where the failure diagnostic unit 144 has received the second restoration completion notification from the second processing circuit 12 (YES in step S306), the failure diagnostic unit 144 terminates the processing.

During a period after the output of the first initialization notification (or the second initialization notification) and before the reception of the first restoration completion notification (or the second restoration completion notification), the failure diagnostic unit 144 outputs, to the data selection circuit 13, a normality notification signal that notifies of a processing circuit that is operating normally similarly to embodiments 1 to 3. The data selection circuit 13 outputs, to the actuator 20, a control value of the processing circuit that is operating normally in accordance with the normality notification signal.

In addition, after the reception of the first restoration completion notification (or the second restoration completion notification), the failure diagnostic unit 144 outputs, to the data selection circuit 13, a normality notification signal that notifies that both the first processing circuit 11 and the second processing circuit 12 are operating normally.

FIG. 11 illustrates an operation example of the first processing circuit 11 and the second processing circuit 12 according to the present embodiment. More specifically, FIG. 11 illustrates an operation example of a processing circuit in which an abnormality has occurred.

An operation of the first processing circuit 11 is described below, but an operation of the second processing circuit 12 is also as described below.

In a case where the first processing circuit 11 has received the first initialization notification from the failure diagnostic unit 144 (YES in step S401), initialization processing is performed on the first processing circuit 11 by resetting or the like (step S402).

The initialization processing may be started under the self-control of the first processing circuit 11, or the first initialization notification may be a signal that causes the initialization processing to start.

Next, when the initialization processing has been completed (YES in step S403), the first processing circuit 11 reads calculation information of the second processing circuit 12 (second processing circuit calculation information) from the second processing circuit 12 (step S404). The second processing circuit calculation information indicates a current calculation state of the second processing circuit 12, namely, details of calculation that the second processing circuit 12 is currently performing.

In a case where the reading of the second processing circuit calculation information has been completed (YES in step S405), the first processing circuit 11 starts the same calculation as calculation of the second processing circuit 12 by using the second processing circuit calculation information (step S406).

Then, the first processing circuit 11 outputs the first restoration completion notification to the failure diagnostic unit 144 (step S407).

*Description of Advantageous Effects of Embodiment*

In configurations according to embodiments 1 to 3, in a case where an abnormality has occurred in either a first processing circuit or a second processing circuit, a vehicle control system needs to be temporarily stopped and maintenance needs to be performed in order to restore both the first processing circuit and the second processing circuit to a normally operating state.

However, in the case of a temporary abnormality, there is a possibility that a processing circuit will return to a normal state by only initializing the processing circuit by resetting or the like.

In the present embodiment, a processing circuit in which an abnormality has occurred during operation can be initialized. Thus, according to the present embodiment, both the first processing circuit and the second processing circuit can be restored to a normal state without stopping the vehicle control system.

Figure 6:
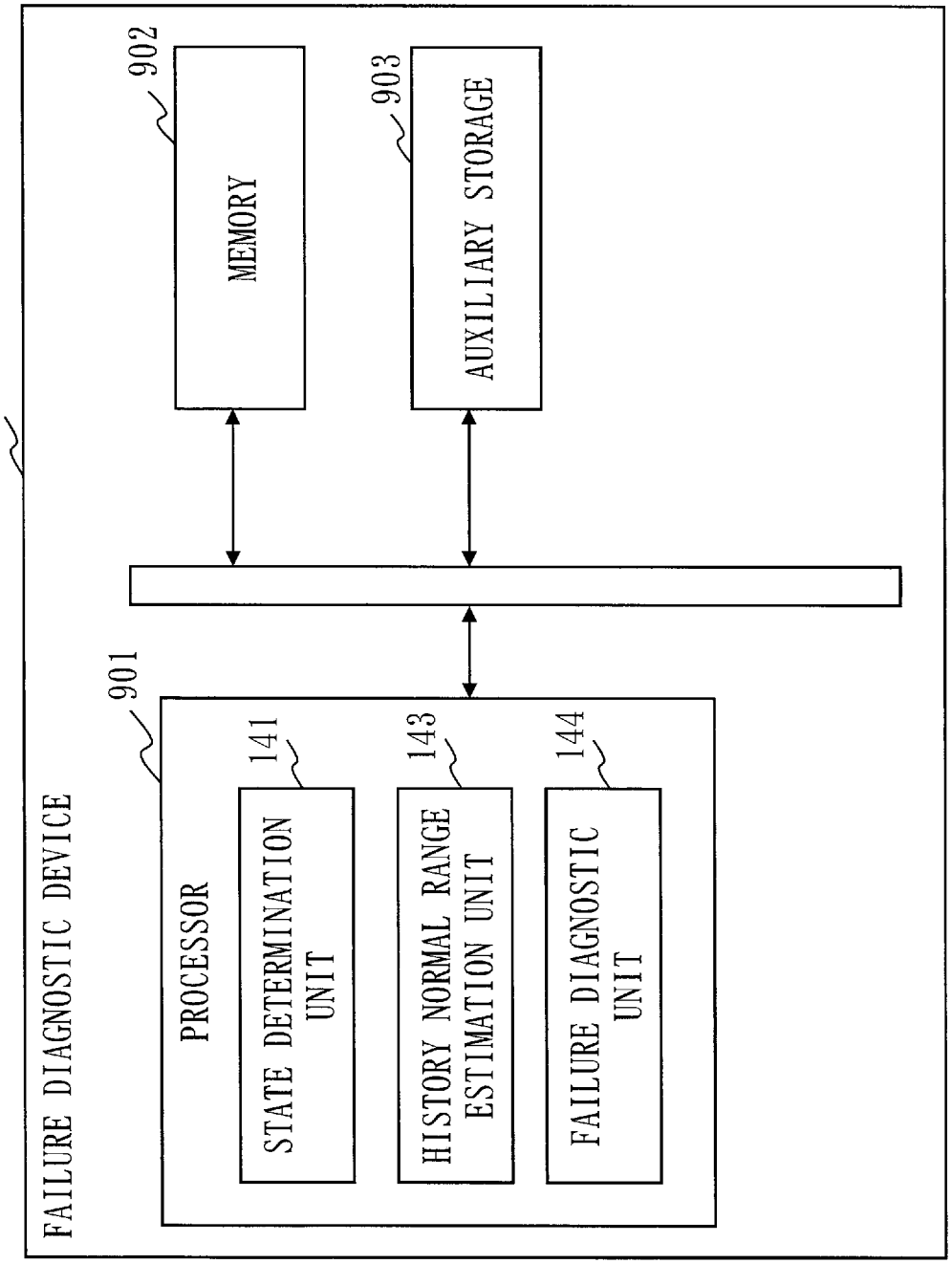
FIG. 6 is a diagram illustrating a hardware configuration example of the failure diagnostic circuits according to the first embodiment and the second embodiment.

An example has been described above where the failure diagnostic device 14 is implemented by an LSI such as an FPGA, a CPLD, or an ASIC. Instead of this, the failure diagnostic device 14 may be implemented by a program by using a processor 901, a memory 902, and an auxiliary storage 903, as illustrated in FIG. 6.

Stated another way, the processor 901 may execute a program which realizes functions of the state determination unit 141, the history normal range estimation unit 143, and the failure diagnostic unit 144 so as to perform the operations described above of the state determination unit 141, the history normal range estimation unit 143, and the failure diagnostic unit 144.

The program which realizes the functions of the state determination unit 141, the history normal range estimation unit 143, and the failure diagnostic unit 144 is stored in the auxiliary storage 903, and is loaded into the memory 902. Then, the processor 901 reads the program from the memory 902, and executes the program.

In addition, the control value storage unit 142 is implemented, for example, by the memory 902 or the auxiliary storage 903.

The program which realizes the functions of the state determination unit 141, the history normal range estimation unit 143, and the failure diagnostic unit 144 is equivalent to an abnormality determination program.

A program which realizes a function of the state determination unit 141, the history normal range estimation unit 143, and the failure diagnostic unit 144 may be stored in a portable storage medium such as a magnetic disk, a flexible disk, an optical disk, a compact disc, a Blu-ray (registered trademark) disc, or a DVD.

In addition, "unit" in the state determination unit 141, the history normal range estimation unit 143, and the failure diagnostic unit 144 may be replaced with "process", "procedure", or "processing".

The processor 901 is, for example, a CPU or a digital signal processor (DSP).

The memory 902 is, for example, a random access memory (RAM).

The auxiliary storage 903 is, for example, a read only memory (ROM), a flash memory, or a hard disk drive (HDD).

Herein, a broader concept of the processor 901, a combination of the processor 901, the memory 902, and the auxiliary storage 903, and a processing circuit such as an LSI is referred to as "processing circuitry".

Stated another way, the processor 901, the combination of the processor 901, the memory 902, and the auxiliary storage 903, and the processing circuit are respective specific examples of the "processing circuitry".

The embodiments of the present invention have been described above, but a combination of these embodiments may be implemented.

Alternatively, one of these embodiments may be partially implemented. Alternatively, a partial combination of these embodiments may be implemented. Note that the present invention is not limited to these embodiments, and various modifications can be made as needed.

REFERENCE SIGNS LIST

10: vehicle control system, 11: first processing circuit, 12: second processing circuit, 13: data selection circuit, 14: failure diagnostic device, 20: actuator, 131: normal control value selection unit, 132: mean value generation unit, 133: output selection unit, 141: state determination unit, 142: control value storage unit, 143: history normal range estimation unit, 144: failure diagnostic unit.

The invention claimed is:

1. An abnormality determination apparatus comprising:
    processing circuitry:
    to obtain a control value for controlling an actuator from each of a first processing circuit and a second processing circuit that are duplicated processing circuits;
    to compare a state normal range and a history normal range with a first control value and a second control value in a case where the first control value does not match the second control value, and to determine whether an abnormality has occurred in the first processing circuit and the second processing circuit, the first control value being obtained from the first processing circuit, the second control value being obtained from the second processing circuit, the state normal range being a range of a normal value of the control value that is estimated from a current operation state of a vehicle that is a higher-order system that includes the actuator or a current operation state of the actuator, the history normal range being a range of the normal value of the control value that is estimated from a plurality of control values that is acquired in the past from the first processing circuit or the second processing circuit;
    to generate a mean value of the first control value and the second control value; and
    to output, to the actuator, the mean value that has been generated, in a case where the first control value and the second control value are within the state normal range and within the history normal range, and it has been determined that no abnormality has occurred in either the first processing circuit or the second processing circuit.

2. The abnormality determination apparatus according to claim 1, wherein
    the processing circuitry estimates the state normal range from a state value that indicates the current operation state of the vehicle or the current operation state of the actuator.

3. The abnormality determination apparatus according to claim 1, wherein
    the processing circuitry outputs the second control value to the actuator in a case where the processing circuitry has determined that the first processing circuit has the abnormality, and outputs the first control value to the actuator in a case where the processing circuitry has determined that the second processing circuit has the abnormality.

4. An abnormality determination method comprising:
    obtaining a control value for controlling an actuator from each of a first processing circuit and a second processing circuit that are duplicated processing circuits;
    comparing a state normal range and a history normal range with a first control value and a second control value in a case where the first control value does not match the second control value, and determining whether an abnormality has occurred in the first processing circuit and the second processing circuit, the first control value being obtained from the first processing circuit, the second control value being obtained from the second processing circuit, the state normal range being a range of a normal value of the control value that is estimated from a current operation state of a vehicle that is a higher-order system that includes the actuator or a current operation state of the actuator, the history normal range being a range of the normal value of the control value that is estimated from a plurality of control values that is acquired in the past from the first processing circuit or the second processing circuit;
    generating a mean value of the first control value and the second control value; and
    outputting to the actuator, the mean value that has been generated, in a case where the first control value and the second control value are within the state normal range and within the history normal range, and it has been determined that no abnormality has occurred in either the first processing circuit or the second processing circuit.

5. A non-transitory computer readable medium storing an abnormality determination program for causing a computer to execute:
  control value obtaining processing of obtaining a control value for controlling an actuator from each of a first processing circuit and a second processing circuit that are duplicated processing circuits;
  abnormality determination processing of comparing a state normal range and a history normal range with a first control value and a second control value in a case where the first control value does not match the second control value, and determining whether an abnormality has occurred in the first processing circuit and the second processing circuit, the first control value being obtained from the first processing circuit, the second control value being obtained from the second processing circuit, the state normal range being a range of a normal value of the control value that is estimated from a current operation state of a vehicle that is a higher-order system that includes the actuator or a current operation state of the actuator, the history normal range being a range of the normal value of the control value that is estimated from a plurality of control values that is acquired in the past from the first processing circuit or the second processing circuit;
  mean value generation processing of generating a mean value of the first control value and the second control value; and
  output processing of outputting, to the actuator, the mean value that has been generated by the mean value generation processing, in a case where the first control value and the second control value are within the state normal range and within the history normal range, and it has been determined by the abnormality determination processing that no abnormality has occurred in either the first processing circuit or the second processing circuit.

6. The abnormality determination apparatus according to claim 1, wherein
  the processing circuitry obtains first self-diagnosis information that indicates a result of self-diagnosis performed in the first processing circuit, and second self-diagnosis information that indicates a result of self-diagnosis performed in the second processing circuit,
  determines whether the abnormality has occurred in the first processing circuit by using the first self-diagnosis information, and determines whether the abnormality has occurred in the second processing circuit by using the second self-diagnosis information; and
  determines whether the first control value matches the second control value in a case where it has been determined that no abnormality has occurred in either the first processing circuit or the second processing circuit.

7. The abnormality determination apparatus according to claim 1, wherein
  the processing circuitry outputs an initialization notification to a processing circuit that has been determined that the abnormality has occurred in, in a case where it has been determined that the abnormality has occurred in any one of the first processing circuit and the second processing circuit, the initialization notification causing initialization processing to be performed.

8. The abnormality determination apparatus according to claim 7, wherein
  after the initialization processing, when a processing circuit being an output destination of the initialization notification has become able to perform calculation identical to calculation of another processing circuit by using calculation information that has been obtained from the another processing circuit and that notifies of a calculation state of the another processing circuit, the processing circuitry obtains a restoration completion notification that notifies that the processing circuit being the output destination of the initialization notification has been restored to a normal state.

* * * * *